US008495892B2

(12) United States Patent
Cheney et al.

(10) Patent No.: US 8,495,892 B2
(45) Date of Patent: Jul. 30, 2013

(54) PROCESS AND APPARATUS FOR THE MANUFACTURING OF FROZEN AERATED PRODUCTS

(75) Inventors: Paul Edward Cheney, Sharnbrook (GB); Leonie Martine Diks-Warmerdam, Vlaardingen (NL); Paul Michael Doehren, Sharnbrook (GB); Stephen John Dyks, Sharnbrook (GB); Jonkheer Theodoor Hendrik van de Poll, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 737 days.

(21) Appl. No.: 11/891,208

(22) Filed: Aug. 9, 2007

(65) Prior Publication Data

US 2008/0038418 A1 Feb. 14, 2008

(30) Foreign Application Priority Data

Aug. 10, 2006 (EP) .................. 06118735

(51) Int. Cl.
  *A23G 9/00* (2006.01)
(52) U.S. Cl.
  USPC .............................. 62/345; 62/340
(58) Field of Classification Search
  USPC .............................. 62/345; 425/52
  See application file for complete search history.

(56) References Cited

U.S. PATENT DOCUMENTS

| 2,555,567 A * | 6/1951 | Bloxham ................. 53/539 |
| 2,705,462 A | 4/1955 | Reinhard |
| 2002/0094362 A1 | 7/2002 | Del Campo et al. |
| 2004/0071834 A1 * | 4/2004 | Dyks et al. ................. 426/100 |
| 2008/0118618 A1 | 5/2008 | Cheney et al. |
| 2009/0011098 A1 | 1/2009 | Doehren |
| 2009/0011100 A1 | 1/2009 | Doehren |

FOREIGN PATENT DOCUMENTS

| EP | 1000551 | 5/2000 |
| GB | 712909 | 8/1954 |
| WO | WO 94/19972 | 9/1994 |
| WO | WO 98/38872 | 9/1998 |
| WO | WO 2004/017748 | 3/2004 |

OTHER PUBLICATIONS

European Search Report Application No. EP 06118735 dated Feb. 8, 2008.
Patent Abstracts of Japan Publication No. 62091148 published Apr. 25, 1987.

(Continued)

*Primary Examiner* — Cheryl J Tyler
*Assistant Examiner* — Lakiya Rogers
(74) *Attorney, Agent, or Firm* — Gerard J. McGowan, Jr.

(57) ABSTRACT

Frozen aerated products are produced by providing two forming elements, providing at least one open cavity on a surface of each forming element, providing filling means for filling said cavities with a frozen aerated material at a temperature higher than the temperature of the forming elements, filling two cavities, one on each forming element, with a frozen aerated material having an overrun of between 10% and 130%, allowing the frozen aerated material to expand outside its cavity and moving the two cavities opposite one another so that the frozen aerated material in each cavity is pressed against the frozen aerated material in the other cavity. A stick is placed between the two filled cavities before the frozen aerated material in each cavity is pressed against the frozen aerated material in the other cavity.

4 Claims, 2 Drawing Sheets

OTHER PUBLICATIONS

Figure 1:
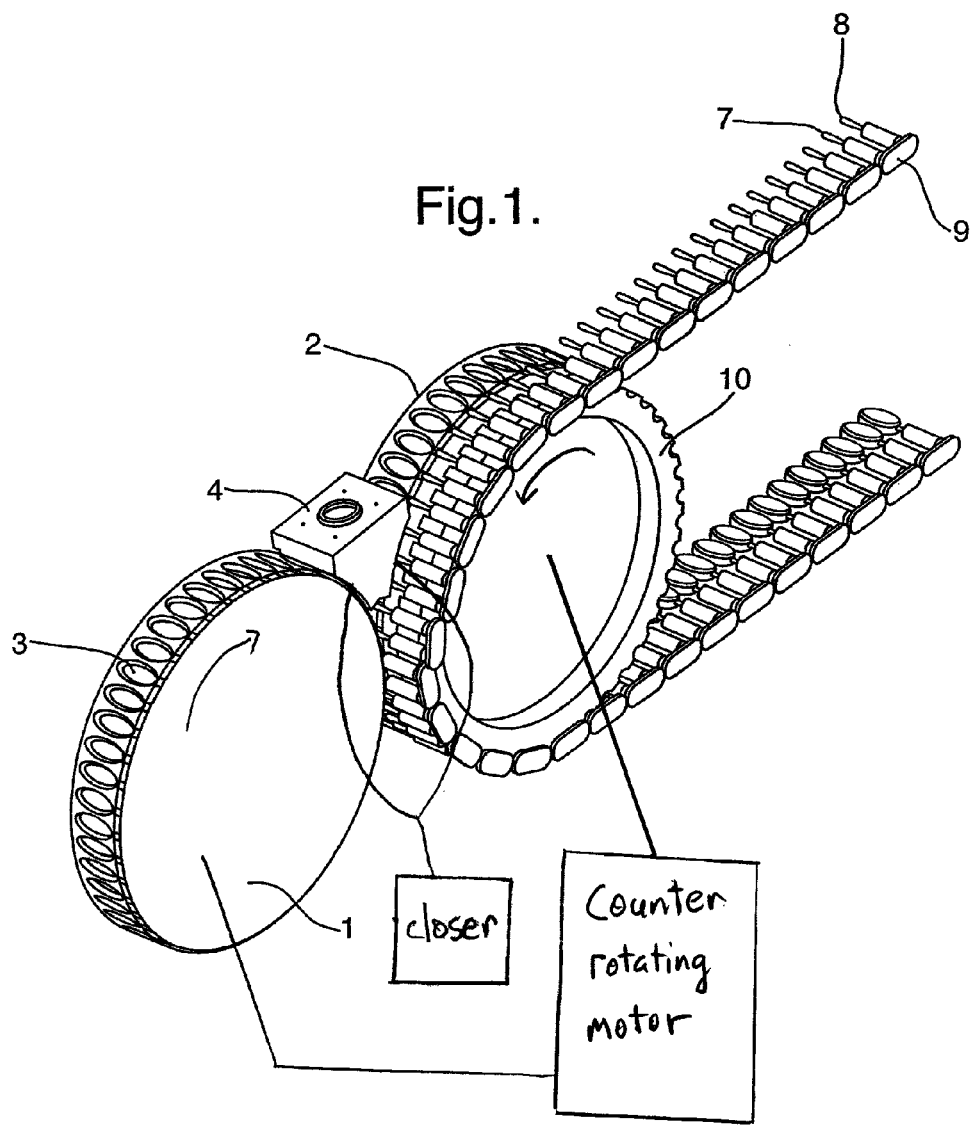

Patent Abstracts of Japan Publication No. 62087056 published Apr. 21, 1987.
Patent Abstracts of Japan Publication No. 58043748 published Mar. 14, 1983.
European Search Report EP 07113340 dated Dec. 3, 2007.
Co-pending application Dyks et al., U.S. Appl. No. 10/643,244, filed Aug. 18, 2003.
Co-pending application Cheney et al., U.S. Appl. No. 11/800,138, filed May 4, 2007.
Co-pending application Doehren, U.S. Appl. No. 12/217,235, filed Jul. 2, 2008.
Co-pending application Doehren, U.S. Appl. No. 12/217,236, filed Jul. 2, 2008.

* cited by examiner

PROCESS AND APPARATUS FOR THE MANUFACTURING OF FROZEN AERATED PRODUCTS

FIELD OF THE INVENTION

The present invention relates to a process and an apparatus for the manufacturing of frozen aerated products. The present invention more particularly relates to the manufacturing of shaped products such as ice cream on a stick.

BACKGROUND OF THE INVENTION

Ice cream products on a stick have been known for decades. They are normally produced by extruding an ice cream log and cutting it perpendicularly, a stick is then inserted in the product leading to an ice cream on a stick which can then be, for example, coated with chocolate and then wrapped in individual packaging.

This basic technology does not allow for the production of complex shapes since it relies on the perpendicular cutting of an extruded log.

Other technologies have been proposed wherein ice cream is injected in a mould made of two halves, a stick is then introduced and the product is then de-moulded (Margolis).

All these technologies rely on first producing the ice cream product, then a stick is added. It leads to having to introduce by brute force a stick in an ice cream whereas this ice cream can, for example contain inclusions (chocolate nuggets, almonds, etc. . . . ). This can cause significant structural damage when the stick hits an inclusion.

More recently, a process was proposed a process for the manufacturing of frozen aerated products comprising;
(a) providing two separate forming elements,
(b) providing at least one open cavity on a surface of each forming element,
(c) providing filling devices for filling said cavities with a frozen aerated material,
(d) filling two cavities, one on each forming element, with a frozen aerated material,
wherein
a. at least one of the cavities is filled with a frozen aerated product having an overrun of between 30% and 130%,
b. this product is then allowed to expand outside its cavity,
c. the two cavities are then moved opposite one another and the frozen aerated product in each cavity is pressed against the frozen aerated product in the other cavity.

This later process presents many advantages, it particularly allows for the production of complex shapes (true 3-dimensional products) at a very high production rate. Nonetheless, products obtained through this process have either no stick or a stick is added to the product after it has been removed from the mould, leading again to the problems already mentioned and relating to the difficulty to introduce a stick in an ice cream, particularly when it contains inclusions.

Tests and Definitions

Frozen aerated product shall mean a frozen confection as described in ICE CREAM—Fourth Edition—W S Arbuckle—Chapman & Hall—pages 297 to 312.

Temperature of the Rollers:

The roller temperature is measured by a resistance temperature probe situated 5 mm beneath the surface.

BRIEF DESCRIPTION OF THE INVENTION

It is a first object of the present invention to provide a process for the manufacturing of frozen aerated products comprising;
(a) providing two forming elements,
(b) providing at least one open cavity on a surface of each forming element,
(c) providing filling means for filling said cavities with a frozen aerated material at a temperature higher than the temperature of the forming elements,
(d) filling two cavities, one on each forming element, with a frozen aerated material having an overrun of between 10% and 130%,
(e) allowing the frozen aerated material to expand outside its cavity and moving the two cavities opposite one another so that
(f) the frozen aerated material in each cavity is pressed against the frozen aerated material in the other cavity
(g) characterised in that a stick is placed between the two filled cavities after step (d) and before step (f)

Preferably, the two separate forming elements are a pair of rollers with parallel axis wherein each roller has a multiplicity of open cavities on its surface, the rollers counter-rotating so that respective cavities in the two forming elements lie opposite one another and the frozen aerated material in a cavity of a first roller is pressed against the frozen aerated material in an opposite cavity of a second roller.

Preferably, the overrun of the frozen aerated material is above 50%, more preferably above 80%.

Preferably, the temperature of the forming elements are cooled with liquid nitrogen and are at a temperature below −80° C., more preferably below −100° C., even more preferably below −130° C. if the forming elements are made of stainless steel. Preferably, the frozen aerated product is at a temperature of between −3° C. and −20° C., preferably between −7° C. and −15° C., even more preferably between −9° C. and −13° C. when filled into the cavities.

More preferably, the frozen aerated product with a stick stays in contact with one of the rollers after step (f). It allows for further heat exchange between the roller and the ice cream product, leading to further cooling of the frozen aerated product, thus increasing its rigidity and hardness and thus its handling in the following steps such as coating and wrapping.

Whereas the two rollers can operate at a constant rotational speed, it has been found advantageous to operate at variable rotational speed. It has particularly been noticed that the filling of the cavities is greatly improved if a roller stops, or at least significantly slows down, while a cavity is filled in. Therefore, the two rollers operate at a variable rotational speed. Preferably the rotational speed of a roller is at its minimal value when a filling device is over a cavity of this roller and at a maximal value when a filling device is between two cavities. More preferably, a roller is brought to stop when a filling device is over a cavity.

Preferably also, the rotational speed of both rollers is at a minimal value when two filled cavities face each other. In a most preferred embodiment, a minimal rotational speed of both rollers is reached when, at the same time, two filled cavities face each other and each filling device is over a cavity of each roller.

It is a second object of the present invention to provide an apparatus for operating the process according to the invention and comprising
two separate forming elements being a pair of rollers with parallel axis wherein each roller has a multiplicity of open cavities on its surface
filling means for filling said cavities with a frozen aerated material,
means for counter-rotating the pair of rollers so that respective cavities in the two forming elements lie opposite one another and the frozen aerated material in a cavity of a first roller is pressed against the frozen aerated material in an opposite cavity of a second roller.

characterised in that
each cavity of a pair of respective cavities is linked to an edge of the roller on which it is located through a groove the groove of a cavity of a pair of respective cavities is adapted to face the groove of the respective cavity during step (f) of the process, the apparatus further comprising closing means adapted to close the grooves when the filling means fill the respective cavities
stick placing means located
to place a stick between the two filled cavities in step (g) of the process and,
to place said stick within a space limited by the respective grooves of the respective cavities during step (f) of the process.

DETAILED DESCRIPTION OF THE INVENTION

Figure 2:
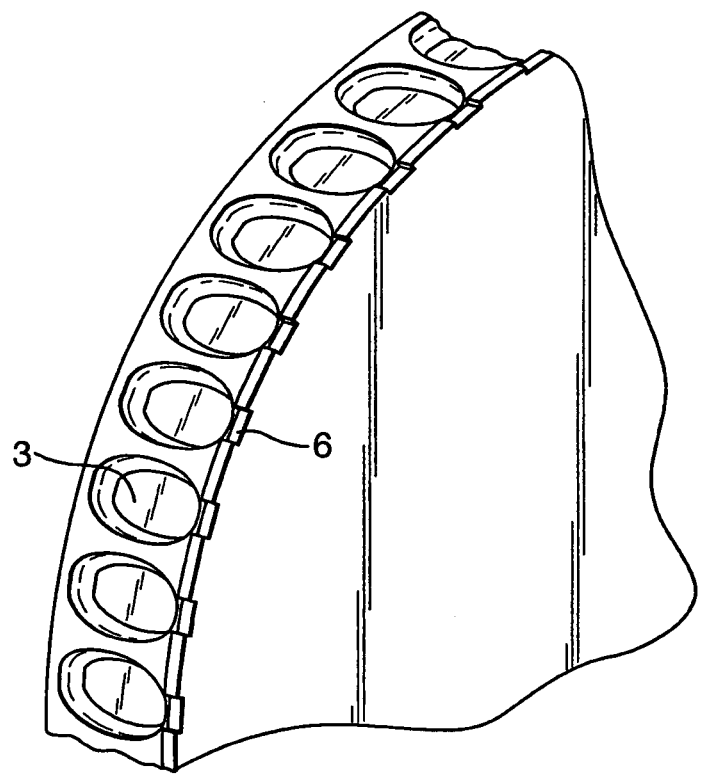
Figure 3:
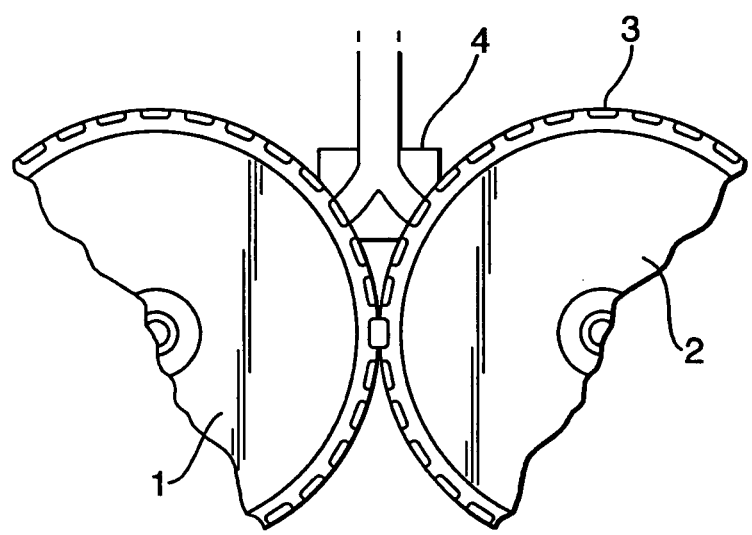

The present invention will be further described with reference to the accompanying drawings wherein
FIG. 1 represents a schematic view of an apparatus according to the present invention.
FIG. 2 represents a detailed view of a part of a roller of an apparatus according to the present invention.
FIG. 3 represents a partial view of an apparatus according to the invention As disclosed in the accompanying drawing, the apparatus comprises a pair of parallel rollers 1 and 2 having mould cavities 3 defined on their outer cylindrical surfaces. A first filling device is provided for supplying frozen aerated product into the mould cavities 3 of the first roller 1. A second filling device is provided for supplying frozen aerated product into the mould cavities 3 of the second roller 2. The first and second filling devices may be independent from one another, alternatively and as disclosed in FIG. 1, there may be one single filling 4 device with two outputs, one for each roller. Motor means, not shown, are arranged for counter rotating the two rollers, to move the two surfaces towards one another and to press the frozen aerated product in a cavity of the first roller against the frozen aerated product situated in a cavity of the second roller.

The two rollers which are adapted to counter-rotate, are positioned to touch each other. By 'touching each other', it is meant a clearance of less than 0.1 mm. The rollers must be refrigerated by circulating an appropriate refrigerating fluid, such as liquid nitrogen, in order to have, in operation, a temperature of below $-100°$ C., as measured by an internal probe 5 mm beneath the surface.

Each of the two filling devices advantageously comprises a manifold mounted in the close proximity to the roller cylindrical surface, with a clearance, in operation of below 1 mm.

The two rollers can be made for example of aluminium or stainless steel and the surface can be treated with a coating to improve hardness (e.g. chromium coating). The mould cavities shapes follow the normal rules for demouldability. Preferably, at the level of mould cavity opening, the mould cavity wall is not substantially vertical. It thus allows a better expansion of the frozen aerated product and a better demouldability.

As shown in FIG. 2, there are shallow grooves 6 at the surface of each roller 1 and 2, linking each cavity 3 to the edge of the roller. These grooves are adapted to accommodate the ice cream stick.

Closing means, not represented, are adapted to close the groove when the filling means are filling a cavity in order to avoid leakage during the filling. Closing means may take various forms, the simplest, and preferred form is a lip on the side of the filling means which blocks the end of the groove at the roller edge when the filling means are facing a cavity and filling it.

In the preferred embodiment disclosed on FIG. 1, two sticks 7 and 8 are held by a carrier 9. Carriers are a sliding fit into a toothed timing wheel 10, which aligns the sticks with the top surface of one roller. The sticks track the mould cavities but are clear of the mould cavities until they are filled. After the filling nozzle 4, the carriers 9 are pushed in, so that the sticks now lie on top of one mould cavity. The two product halves in a pair of facing cavities (one on each roller) then meet at the roller nip. Using the timing wheel 10, products remain pressed against one roller, to extract more heat from this one side of the product, hence ensuring a better rigidity of the product on its stick for further handling.

EXAMPLE 1

The following ice cream was produced (% in w/w)
9.0% vegetable oil
4.6% corn syrup
0.4% emulsifier
0.3% stabiliser
0.1% colour
14.1% sucrose
7.8% skim milk powder
2.7% whey powder
0.1% flavour
60.9% water
Overrun: 65%,
Temperature: $-10.8$ C.

The rollers had a temperature of $-170$ C and had a single lane of cavities. The rollers were operated at a speed of 82 products/minute with a pause time of 350 ms. The volume of each pair of cavities was 85 ml. The product halves were firmly adhered together and to the stick. Holding the product by the stick and shaking vigorously up and down by hand for 30 seconds failed to dislodge the product.

EXAMPLE 2

In this example, the cavities were filled with:
70% wt/wt ice cream as in example 1
15% wt/wt caramel sauce
15% wt/wt nuts.

The ice cream had an overrun of 76% and a temperature of $-11.7$ C.
Sauce recipe:
skim milk powder 12.8%
sucrose 28.6%
corn syrup 29.4%
vegetable oil 11.6%
stabiliser 0.5%
water 17.1%
Temperature: 16.5 C.

The sauce flow rate adjusted to give correct weight ratio with ice cream and coextruded with the ice cream through the same filling nozzle.
Nuts:
Chocolate-coated almonds with an average diameter of 6 mm were fed and mixed into ice cream upstream of the cold rollers machine.

The rollers had a temperature of $-170$ C and had a single lane of cavities. They were operated at a speed of 80 products/minute with a pause time of 375 ms. The volume of each pair of cavities was 85 ml.

The product halves were well adhered together and to the stick. When the product was held vertically by the stick (stick highest), all products were retained on the stick for at least one minute.

The invention claimed is:
1. Process for the manufacturing of frozen aerated products comprising;
  (a) providing two forming elements, which are a pair of rollers with parallel axis,
  (b) providing a multiplicity of cavities on a surface of each roller,
  (c) providing a filler for filling said cavities with a frozen aerated material at a temperature higher than the temperature of the forming elements,
  (d) filling two cavities, one on each forming element, with a frozen aerated material having an overrun of between 10% and 130%,
  (e) allowing the frozen aerated material to expand outside of the cavities,
  (f) counter-rotating the rollers so that respective cavities in the two forming elements lie opposite one another and the frozen aerated material in a cavity of a first roller is pressed against the frozen aerated material in an opposite cavity of a second roller,
  (g) wherein
    each cavity of the respective cavities is lined to an edge of the roller on which the cavity is located through a groove which is adapted to face the groove of the respective cavities during step (f)
    a closer closes the groove when the filler fills the respective cavities, the closer comprising a lip on the side of the filler which blocks an end of the groove at the roller edge when the filler face a cavity and fills one of the respective cavities, and
    a stick is placed between the two filled respective cavities after step (d) and before step (f), within a space limited by the respective grooves of the respective cavities during step (f).

2. Process according to claim 1 wherein the temperature of the forming elements are cooled with liquid nitrogen and are at a temperature below −80° C.

3. Process according to claim 1 wherein the frozen aerated product with a stick stays in contact with one of the rollers after step (f).

4. Apparatus for operating the process according to claim 1 comprising the two separate forming elements being the pair of rollers with parallel axis wherein each roller has a multiplicity of open cavities on the surface
  the filler for filling said cavities with the frozen aerated material,
  a rotator for counter-rotating the pair of rollers so that the respective cavities in the two forming elements lie opposite one another and the frozen aerated material in the opposite cavity of the second roller, wherein,
  the cavities of the pair of respective cavities is linked to the edge of the roller on which it is located through the groove
  the groove of the respective cavity of the pair of respective cavities is adapted to face the groove of the respective cavity during step (f) of the process; the apparatus further comprising
  the closer adapted to close the grooves when the filling means fills the respective cavities
  a stick placer located
    to place the stick between the two filled respective cavities in step (g) of the process and,
    to place said stick within the space limited by the respective grooves of the respective cavities during step (f) of the process.

* * * * *